United States Patent
Günthner et al.

(10) Patent No.: US 8,794,047 B2
(45) Date of Patent: Aug. 5, 2014

(54) METHOD FOR THE PRECISE MEASURING OPERATION OF A MICROMECHANICAL ROTATION RATE SENSOR

(75) Inventors: Stefan Günthner, Frankfurt (DE);
Roland Hilser, Kirchheim Teck (DE);
Ramnath Sivaraman, Frankfurt (DE);
Bernhard Schmid, Friedberg (DE);
Petri Klemetti, Perttula (FI)

(73) Assignees: Continental Teves AG & Co. oHG (DE); VTI Technologies Oy (FI)

( * ) Notice: Subject to any disclaimer, the term of this patent is extended or adjusted under 35 U.S.C. 154(b) by 308 days.

(21) Appl. No.: 13/266,613

(22) PCT Filed: Apr. 28, 2010

(86) PCT No.: PCT/EP2010/055708
§ 371 (c)(1),
(2), (4) Date: Jan. 11, 2012

(87) PCT Pub. No.: WO2010/125098
PCT Pub. Date: Nov. 4, 2010

(65) Prior Publication Data
US 2012/0118062 A1 May 17, 2012

(30) Foreign Application Priority Data
Apr. 30, 2009 (DE) .......................... 10 2009 019 318

(51) Int. Cl.
*G01C 19/56* (2012.01)
(52) U.S. Cl.
USPC ........................................ 73/1.37; 73/504.12
(58) Field of Classification Search
USPC .............................................. 73/1.37, 504.12
See application file for complete search history.

(56) References Cited

U.S. PATENT DOCUMENTS

| 5,992,233 A * | 11/1999 | Clark .......................... 73/504.12 |
| 6,067,858 A | 5/2000 | Clark |
| 6,553,833 B1 | 4/2003 | Funk |
| 8,479,555 B2 * | 7/2013 | Classen et al. .................. 73/1.37 |

(Continued)

FOREIGN PATENT DOCUMENTS

| DE | 19939998 A1 | 3/2001 |
| DE | 102007030119 A1 | 1/2009 |
| WO | 03010492 A1 | 2/2003 |

OTHER PUBLICATIONS

International Search Report issued in PCT/EP2010/055708 filed Apr. 28, 2010, mailed Aug. 2, 2010.

(Continued)

*Primary Examiner* — John Chapman, Jr.
(74) *Attorney, Agent, or Firm* — RatnerPrestia

(57) ABSTRACT

A method and apparatus for the precise measuring operation of a micromechanical rotation rate sensor, including at least one deflectively suspended seismic mass, at least one drive device for driving the seismic mass, and at least one first and one second trimming electrode element, which are jointly assigned directly or indirectly to the seismic mass, a first electrical trimming voltage ($U_{TO1}$, $U_{TLO1}$, $U_{TRO1}$) being set between the first trimming electrode element and the seismic mass, and a second electrical trimming voltage ($U_{TO2}$, $U_{TLO2}$, $U_{TRO2}$) being set between the second trimming electrode element and the seismic mass, the first and the second electrical trimming voltages being set at least as a function of a quadrature parameter ($U_T$) and a resonance parameter ($U_f$).

13 Claims, 8 Drawing Sheets

(56) References Cited

U.S. PATENT DOCUMENTS

2001/0039834 A1 11/2001 Hsu
2003/0159510 A1 8/2003 Stewart
2008/0282833 A1 11/2008 Chaumet
2010/0116050 A1 5/2010 Wolfram

OTHER PUBLICATIONS

German Application Serial No. 102009019318.9, German Search Report mailed Sep. 28, 2010, 4 pgs.

* cited by examiner

Fig. 1
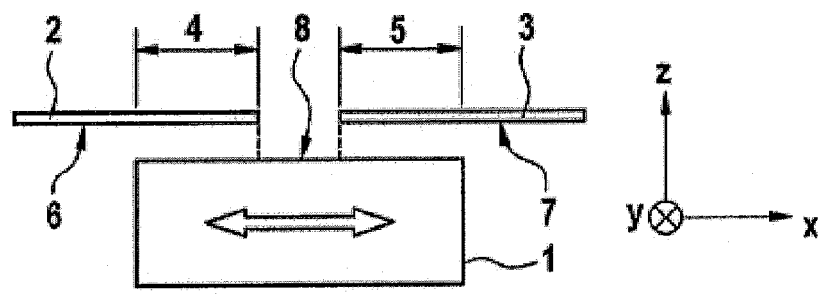
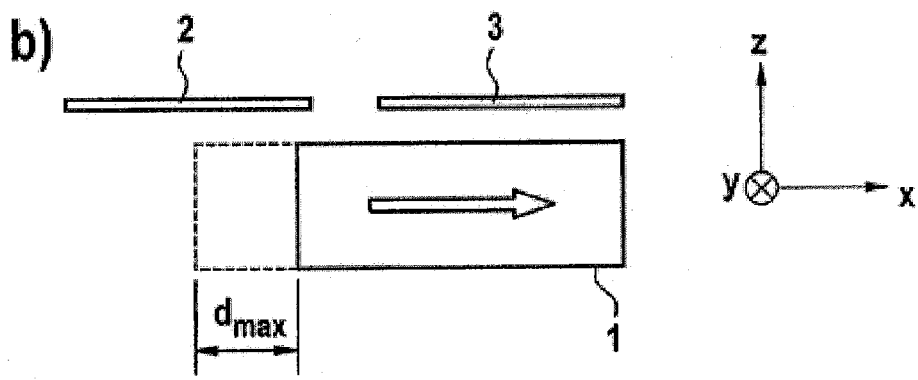
Fig. 2
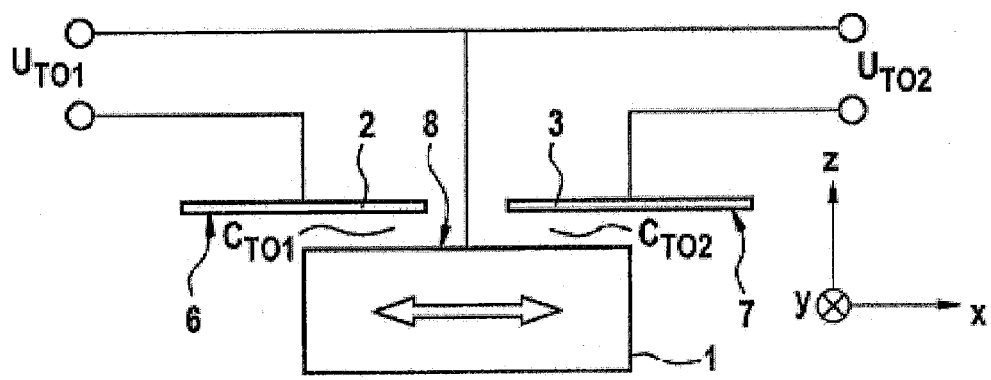

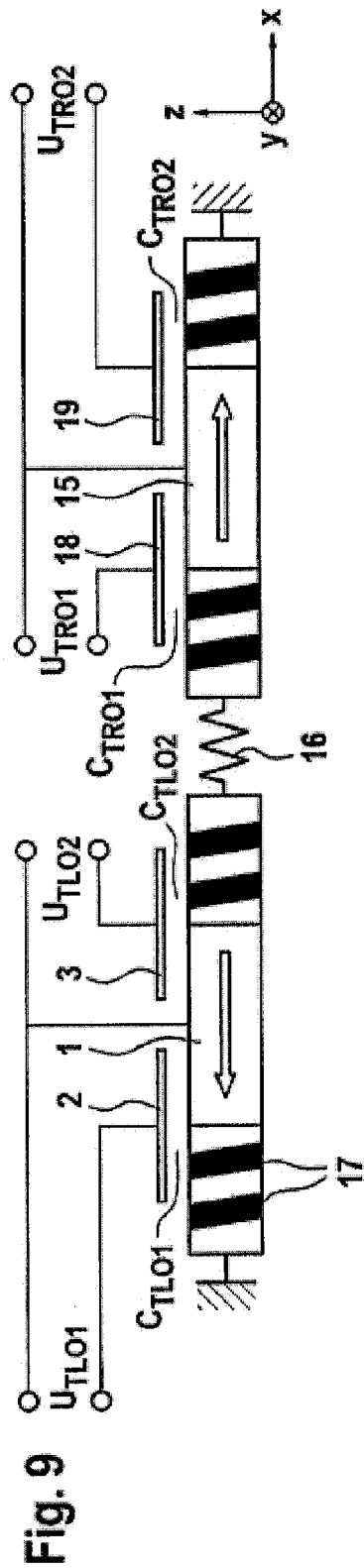
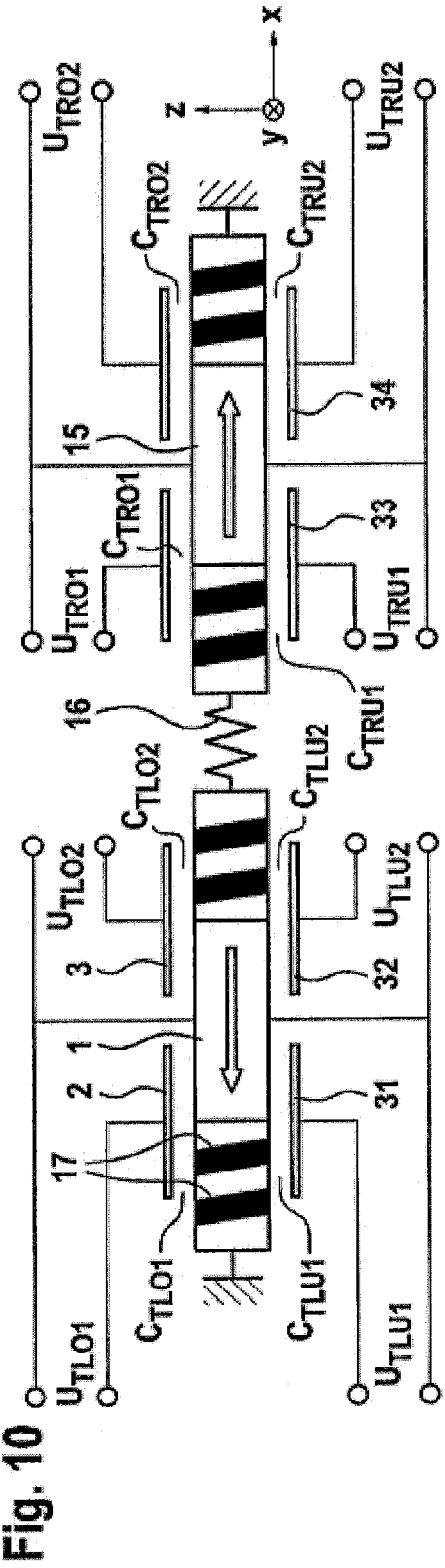
Fig. 9
Fig. 10

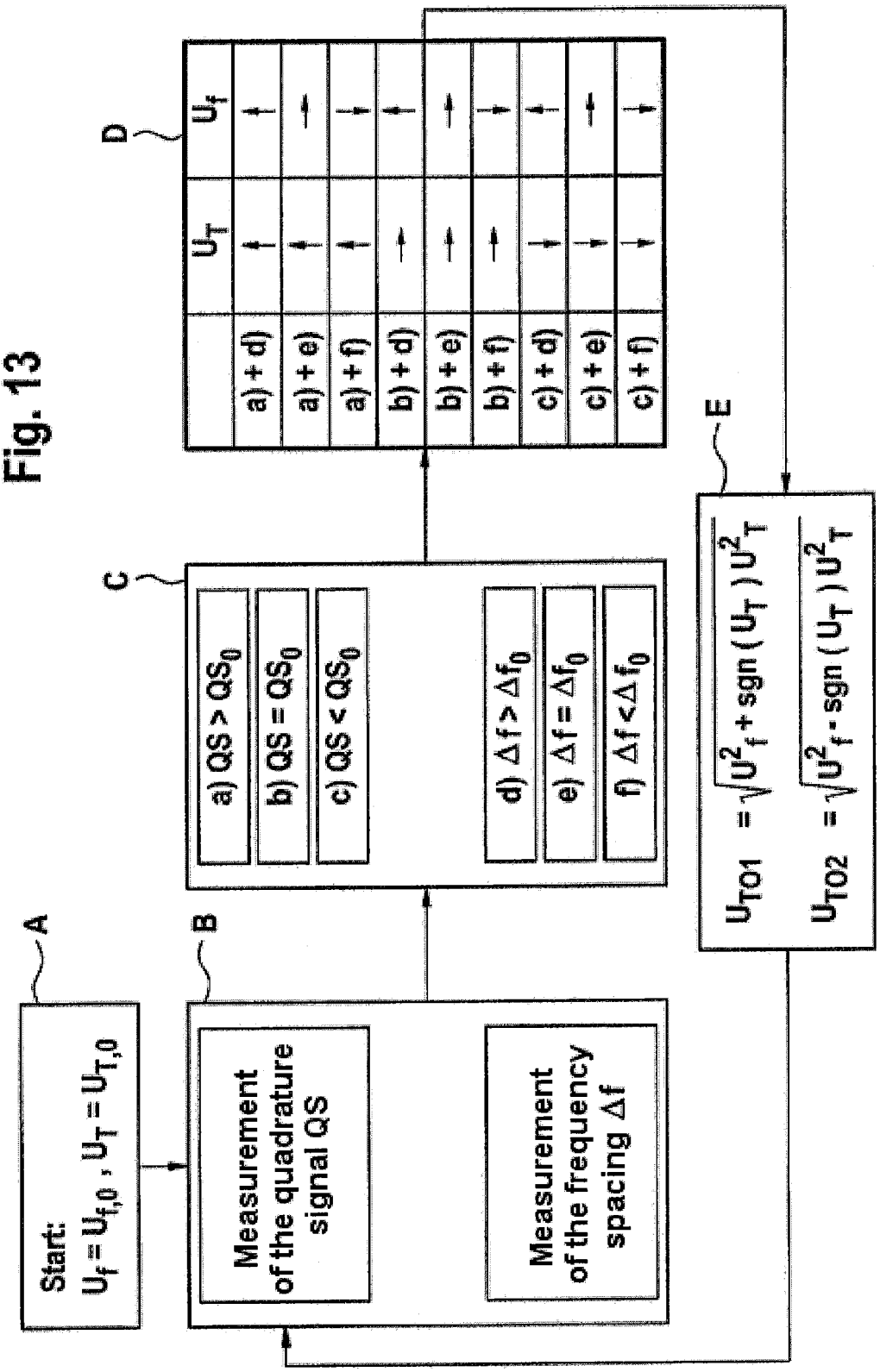

US 8,794,047 B2

METHOD FOR THE PRECISE MEASURING OPERATION OF A MICROMECHANICAL ROTATION RATE SENSOR

CROSS-REFERENCE TO RELATED APPLICATIONS

This application is the U.S. National Phase Application of PCT/EP2010/055708, filed Apr. 28, 2010, which claims priority to German Patent Application No. DE 10 2009 019 318.9, filed Apr. 30, 2009, the contents of such applications being incorporated by reference herein.

FIELD OF THE INVENTION

The invention relates to a method for the precise measuring operation of a micromechanical rotation rate sensor in accordance with a method for the precise measuring operation of a micromechanical rotation rate sensor, comprising at least one deflectively suspended seismic mass, at least one drive device for driving the seismic mass and at least one first and one second trimming electrode element, which are jointly assigned directly or indirectly to the seismic mass, a first electrical trimming voltage ($U_{TO1}$, $U_{TLO1}$, $U_{TRO1}$, $U_{TU2}$, $U_{T1H}$, $U_{T2V}$) being set between the first trimming electrode element and the seismic mass, and a second electrical trimming voltage ($U_{TO2}$, $U_{TLO2}$, $U_{TRO2}$, $U_{TU1}$, $U_{T2H}$, $U_{T1V}$) being set between the second trimming electrode element and the seismic mass, characterized in that, the first and the second electrical trimming voltages are set at least as a function of a quadrature parameter ($U_T$) and a resonance parameter ($U_f$), a micromechanical rotation rate sensor in accordance comprising at least one deflectively suspended seismic mass, at least one drive device for driving the seismic mass and at least one first and one second trimming electrode element, which are jointly assigned directly or indirectly to the seismic mass, in particular at least the first trimming electrode element being connected to a first electrical voltage source, a first electrical trimming voltage ($U_{TO1}$, $U_{TLO1}$, $U_{TRO1}$, $U_{TU2}$, $U_{T1H}$, $U_{T2V}$) being set between the first trimming electrode element and the seismic mass, and a second electrical trimming voltage ($U_{TO2}$, $U_{TLO2}$, $U_{TRO2}$, $U_{TU1}$, $U_{T2H}$, $U_{T1V}$) being set between the second trimming electrode element and the seismic mass, wherein the rotation rate sensor is designed such that it is suitable for carrying out the method, and the use of the rotation rate sensor in motor vehicles.

BACKGROUND OF THE INVENTION

It is known that micromechanical springs for suspending seismic masses in rotation rate sensors in part cause deflections in the readout direction in the drive mode simply because of relatively slight manufacturing inaccuracies, which in the absence of a rotation rate lead, in particular, to undesired flank angles of the respective structures. As a result of this, interference signals are generated that can undesirably be evaluated as rotation rate signal components, and thus corrupt the rotation rate signal and/or cause a measuring error with reference to the rotation rate signal.

Such undesired flank angles or tiltings of springs are process induced and can be avoided only to some degree. The above-described interference signals which are produced not owing to an acquired rotation rate but owing to defective deflections in the readout direction as a function of the deflection of the seismic mass and of the springs thereof in the drive direction, are also denoted as quadrature or quadrature signals.

Printed publication WO 03/010492 A1, which is incorporated by reference, proposes a method for suppressing quadrature signals in a rotation rate sensor that comprises two trimming electrode arrangements which are assigned to a seismic mass, in the case of which method the quadrature of the rotation rate sensor is suppressed by means of the voltage applied to the trimming electrodes. However, this quadrature suppression can have an undesirable influence on the resonant frequency of the readout mode of the rotation rate sensor, as a result of which the difference frequency between the resonant frequencies with regard to the drive mode and the readout mode of the rotation rate sensor is also changed. This is all the more disadvantageous because the voltage applied to the trimming electrodes is squared in the shift of the resonant frequency of the readout mode.

It is usual for the quadrature of rotation rate sensors of a wafer to exhibit relatively strong dispersion because of process fluctuations, and/or to differ relatively strongly from rotation rate sensor to rotation rate sensor of a wafer.

SUMMARY OF THE INVENTION

An aspect of the present invention is a method in which an undesired influence on the frequency/resonant frequency of the readout mode of the rotation rate sensor in the course of quadrature suppression can be avoided and, in particular, a desired resonant frequency can be set in conjunction with quadrature suppression.

This is achieved according to aspects of the invention by the method for the precise measuring operation of a micromechanical rotation rate sensor, comprising at least one deflectively suspended seismic mass, at least one drive device for driving the seismic mass and at least one first and one second trimming electrode element, which are jointly assigned directly or indirectly to the seismic mass, a first electrical trimming voltage ($U_{TO1}$, $U_{TLO1}$, $U_{TRO1}$, $U_{TU2}$, $U_{T1H}$, $U_{T2V}$) being set between the first trimming electrode element and the seismic mass, and a second electrical trimming voltage ($U_{TO2}$, $U_{TLO2}$, $U_{TRO2}$, $U_{TU1}$, $U_{T2H}$, $U_{T1V}$) being set between the second trimming electrode element and the seismic mass, characterized in that, the first and the second electrical trimming voltages are set at least as a function of a quadrature parameter ($U_T$) and a resonance parameter ($U_f$), and by the micromechanical rotation rate sensor, comprising at least one deflectively suspended seismic mass, at least one drive device for driving the seismic mass and at least one first and one second trimming electrode element, which are jointly assigned directly or indirectly to the seismic mass, in particular at least the first trimming electrode element being connected to a first electrical voltage source, a first electrical trimming voltage ($U_{TO1}$, $U_{TLO1}$, $U_{TRO1}$, $U_{TU2}$, $U_{T1H}$, $U_{T2V}$) being set between the first trimming electrode element and the seismic mass, and a second electrical trimming voltage ($U_{TO2}$, $U_{TLO2}$, $U_{TRO2}$, $U_{TU1}$, $U_{T2V}$, $U_{T1V}$) being set between the second trimming electrode element and the seismic mass, wherein the rotation rate sensor is designed such that it is suitable for carrying out the method.

The invention is based in particular on the idea of setting or applying or adjusting a first and a second trimming voltage at a first and a second trimming electrode of a rotation rate sensor at least substantially as a function of a quadrature parameter and a resonance parameter.

It is expedient also to regard the setting of the trimming voltages as a control operation.

The quadrature parameter is preferably to be understood as a measure of the quadrature of the rotation rate sensor and/or with regard to the deflection behavior of the at least one seismic mass. In particular, the quadrature parameter is a function of the quadrature signal or quadrature signal component of the output signal of the rotation rate sensor, which is phase shifted by substantially 90° or 270° in relation to the component of the output signal of the rotation rate sensor that displays the rotation rate. Moreover, the quadrature signal is phase shifted by 0° or 180°, in particular, in relation to the primary signal or the drive mode. It is particularly preferred for the quadrature parameter to be a manipulated variable in a control system or controller with the aid of which it is necessary to drive an actuator of the seismic mass in order to suppress or to avoid the quadrature or the quadrature signal of the seismic mass. It is very particularly preferred in this case that the quadrature parameter is defined via the electrical voltage to be applied as manipulated variable to the actuator, and has the same unit.

The resonance parameter is preferably understood as a measure of the frequency or natural frequency of the readout mode or, alternatively, preferably as a measure of the frequency difference between the frequency or natural frequency of the readout mode and the frequency of the drive mode. In particular, the resonance parameter is determined as a function of the resonant frequencies of the rotation rate sensor with reference to its drive mode and its readout mode, or is a function of these values. It is particularly preferred that in this case the rotation rate sensor be operated so that the frequency difference of the resonant frequency of the readout mode minus the resonant frequency of the drive mode substantially has a defined value or be adjusted to a defined value or alternatively, preferably be virtually zero or be adjusted to zero. It is very particularly preferred in this case that the resonance parameter is defined via an electrical voltage to be applied as manipulated variable to the actuator, and has the same unit.

It is expedient for the resonance parameter to be a control parameter in order to adjust the readout frequency to a defined value or to a defined value in relation, particularly defined by a frequency difference, to the excitation frequency.

It is preferred for the frequency of the readout mode to be understood as the frequency of the readout or secondary mode, or the natural frequency of the readout or secondary oscillator, and for the frequency of the excitation signal or the excitation frequency to be understood as the frequency of the drive mode or primary mode, or the natural frequency of the drive/primary oscillator.

What is understood as a drive mode or primary mode is an eigenmode of a rotation rate sensor, preferably the natural vibration, with particular preference the vibration with a resonant frequency, of the at least one seismic mass, at which the seismic mass of the rotation rate sensor permanently vibrates, in particular. The rotation rate sensor very particularly preferably has at least two seismic masses that are coupled to one another and vibrate in phase opposition or respectively are deflected with inverse orientation to one another in the same direction in the course of the drive mode.

A readout mode or secondary mode is understood as an eigen-mode that is preferably set on the basis of a rotation rate and the action, associated therewith, of the Coriolis force.

The rotation rate sensor preferably comprises a substrate that is connected to the system or the inertial system whose rotation rate is to be acquired or measured. This connection is, in particular, rigid and/or stiff in design. It is particularly preferred for the at least one seismic mass to be suspended on the substrate, and for the at least two trimming electrode elements to be permanently connected to the substrate.

The rotation rate sensor preferably comprises a substrate that is substantially parallel to the x-y plane of a Cartesian coordinate system with reference to its base surface. In particular, the drive mode is impressed in the x-direction in this case, and the readout mode is impressed in the y- or z-direction, or the drive mode is impressed in the y-direction and the readout mode in the x- or z-direction. The rotation rate sensor is expediently correspondingly designed.

What is understood by a substrate is a base element and/or carrier element and/or housing part of the rotation rate sensor that is preferably a substantially unstructured part of the wafer from which the rotation rate sensor is formed. It is particularly preferred that the substrate consists of crystalline or polycrystalline, in particular conducting, silicon, or of one or more layers of semiconductor material and/or metal(s) and/or electrically insulating layers.

The rotation rate sensor expediently has at least one drive device or a drive means for driving the seismic mass, as well as one or more readout devices for directly or indirectly acquiring the deflection of the seismic mass.

It is preferred that the rotation rate sensor be designed and arranged with reference to a Cartesian x-y-z-coordinate system such that the drive direction is in the x-direction and said sensor can acquire rotation rates about the z-axis and/or x-axis.

It is preferred that the rotation rate sensor be designed such that it can acquire rotation rates about at least two different axes, that is to say that the rotation rate sensor has a "multi-axial" design.

A seismic mass preferably comprises at least partially one or more drive devices and/or at least partially one or more readout devices and/or one or more additional micromechanical elements of the rotation rate sensor.

The rotation rate sensor is preferably produced by means of at least one micromechanical method. In this case, the structures are etched into a diaphragm material, in particular silicon, particularly preferably using anisotropic dry etching substantially perpendicularly through the diaphragm. The plane of the diaphragm base area extends substantially parallel to the substrate surface. At the locations where the diaphragm is permanently connected to the substrate lying therebelow, anchoring points are produced at which, in turn either spring elements or fixed structures are fastened. As a result, rigid bodies that are suspended from springs can be implemented in a freely vibrating fashion. The anchoring points are very particularly preferably electrically insulated from one another by insulating layers, and contact can be made with them from outside.

It is preferred for the first and the second trimming electrode elements to be designed and arranged in a substantially fixed fashion, particularly with regard to their respective electrode surface and to be electrically insulated and spaced apart in relation to the seismic mass.

The trimming electrode elements are expediently insulated from one another and particularly preferably of identical design in each case.

The first and the second trimming electrode elements are preferably arranged above or below, or one above and one below, the seismic mass, and/or arranged in front of or behind, or one in front of and one behind, the seismic mass.

The rotation rate sensor expediently has two seismic masses that are coupled to one another.

The at least one seismic mass is preferably assigned two additional trimming electrode elements.

The first and second trimming voltages are preferably additionally set in mutual dependence on one another.

The setting of the first and second trimming voltages is preferably performed by means of a control system. During operation of the rotation rate sensor, this control or the control method is carried out, in particular, at defined times or periodically or permanently. The control is particularly preferably designed as a "closed loop" control.

The method is preferably extended by determining the quadrature parameter at defined times or periodically or permanently as a function of or from the quadrature signal, and by determining the resonance parameter at defined times or periodically or permanently as a function of or from the frequency of the readout mode or from the frequency difference between the readout mode and drive mode.

The first and second trimming voltages are preferably set/adjusted so that the sum of the square of the first electrical trimming voltage multiplied by a first constant factor and of the square of the second electrical trimming voltage multiplied by a second constant factor, is held constant and/or is set/adjusted to a first reference value of the resonance parameter in relation to the square. It is particularly so in this case that in addition the difference of the square of the first electrical trimming voltage multiplied by a third constant factor and of the square of the second electrical trimming voltage multiplied by a fourth constant factor, is held constant and/or is set/adjusted to a first reference value of the quadrature parameter in relation to the square. It has emerged that the above driving/controlling of the first two trimming electrode elements by means of the first two trimming voltages is particularly suitable for quadrature suppression and simultaneously defined setting of a resonance parameter or the resonant frequency of the seismic mass with regard to the readout mode in the particularly preferred case where the trimming electrode elements with their electrode surface respectively jointly assigned to the seismic mass are arranged substantially parallel to the trimming surface of the seismic mass in the undeflected state, and said electrode surfaces are substantially of flat design.

As a preferred alternative, the first and the second electrical trimming voltages are set/adjusted so that the sum of the first electrical trimming voltage multiplied by a first constant factor and of the second electrical trimming voltage multiplied by a second constant factor, is held constant and/or is set/adjusted to a first reference value of the resonance parameter, particularly in addition, the difference of the first electrical trimming voltage multiplied by a third constant factor and the second electrical trimming voltage multiplied by a fourth constant factor, being held constant and/or being set/adjusted to a first reference value of the quadrature parameter.

The first electrical trimming voltage $U_{TO1}$ and the second electrical trimming voltage $U_{TO2}$ are preferably set and/or adjusted substantially in accordance with the following equations as a function of the quadrature parameter $U_T$ and the resonance parameter $U_f$:

$$U_f^2 = \alpha * U_{TO1}^2 + \beta * U_{TO2}^2 \text{ and}$$

$$U_T^2 = (\gamma * U_{TO1}^2 - \delta * U_{TO2}^2) * sgn(QS) * \epsilon$$

or $$U^2_{TO1} = (\beta * U^2_T * sgn(QS) * \epsilon + \delta * U^2_f)/(\alpha * \delta + \beta * \gamma)$$

$$U^2_{TO2} = (\gamma * U^2_f - \alpha * U^2_T * sgn(QS) * \epsilon)/(\alpha * \delta + \beta * \gamma)$$

Here, $\alpha$, $\beta$, $\gamma$ and $\delta$ are the first, the second, the third and the fourth constant factors. The expression sgn(QS) in this case symbolizes or stands for the signum function of the quadrature signal QS. Here, the parameter $\epsilon$ is a constant, in particular 1, whose sign is determined as a function of the following conditions:

when squaring the quadrature parameter $U_T$ leads to a reduction in the quadrature signal, the constant is positive, and when the quadrature signal QS is decreased upon an increase in the term $\gamma * U_{TO1}^2 - \delta * U_{TO2}^2$ then it holds that $\epsilon = 1$;

when squaring the quadrature parameter $U_T$ leads to an increase in the quadrature signal, the constant is negative, and when the quadrature signal QS is decreased upon an increase in the term $\delta * U_{TO2}^2 - \gamma * U_{TO1}^2$ then it holds that $\epsilon = -1$.

In accordance with the relationship illustrated in these equations it is preferred to set the resonant frequency of the readout mode independently of the quadrature suppression and/or to set the resonance parameter independently of the quadrature parameter.

It is expedient if the first, the second, the third and the fourth constant factors have a positive value that is respectively at least a function of a first and a second trimming capacitor, the first trimming capacitor being at least a function of the respective design of the first trimming electrode element and of the seismic mass as well as their arrangement and relative motion behavior relative to one another, and the second trimming capacitor being at least a function of the respective design of the second trimming electrode element and of the seismic mass as well as their arrangement and relative motion behavior relative to one another.

The method preferably comprises a control method by which the resonance parameter is prescribed as a time function of at least one additional parameter of the rotation rate sensor and/or of an additional parameter that influences the operation of the rotation rate sensor, or is replaced by at least one second reference value of the resonance parameter. In particular, this additional parameter is a temperature prevailing in the rotation rate sensor and/or in its immediate surroundings, since the resonance parameter is a temperature-dependent variable.

It is preferred that in the context of the method information relating to the operating behaviour of the rotation rate sensor be present or be provided in a fashion dependent on the temperature in the form of at least one function and/or of data.

It is preferred that at least the first trimming electrode element is connected to a first electrical voltage source and the second trimming electrode element and/or the seismic mass are/is connected, in particular, to a second electrical voltage source.

It is expedient that the first and the second trimming electrode elements respectively have at least one electrode surface that are arranged situated opposite a trimming surface of the seismic mass in a substantially parallel fashion, and the electrode surfaces of the first and second trimming electrode elements always being assigned an opposite region of the trimming surface, and/or overlapping the same, in particular independently of the state of deflection of the seismic mass, at least up to a defined amplitude/deflection, with particular preference also given maximum deflection of the seismic mass. The electrode surfaces expediently always project in this case along the opposite region of the trimming surface. The electrode surfaces and the trimming surface are very particularly preferred to be of substantially flat design.

It is preferred that the rotation rate sensor have four or a multiple of four trimming electrode elements of which two or a multiple of two respectively have an electrode surface parallel to the x-y plane, and two or a multiple of two respectively have an electrode surface parallel to the x-z plane and/or y-z plane. These trimming electrode elements are in this case jointly assigned two or more seismic masses. In particular, two or more seismic masses of the rotation rate sensor are respectively assigned eight such trimming electrode elements.

The rotation rate sensor is expediently designed as a 2-axis rotation rate sensor or, alternatively, preferably as a 3-axis rotation rate sensor, having as a 3-axis rotation rate sensor at least respectively two, in particular exactly two, trimming electrode elements parallel to the x-y, x-z, and y-z planes.

The rotation rate sensor expediently comprises at least two seismic masses that are coupled to one another via at least one coupling element, in particular a coupling spring and/or a coupling bar and, in particular, are driven in antiphase by means of at least one drive device or have an antiphase drive mode so that the common centroid of these seismic masses remains substantially at rest.

The rotation rate sensor is preferably formed at least partially from silicon, in particular monocrystalline silicon, the at least one seismic mass and/or at least one suspension element of the seismic mass particularly preferably being formed from conducting polycrystalline silicon or alternatively preferably from crystalline and/or mono crystalline silicon.

The invention also relates to the use of the rotation rate sensor in motor vehicles, particularly in a motor vehicle control system.

The inventive method and the inventive rotation rate sensor can be used in different fields to acquire one or more rotation rates and/or, by means of appropriate signal processing, to acquire one or more rotational accelerations. In this case, the use in vehicles, particularly in motor vehicles and aircraft, in automation technology, in navigation systems, in image stabilizers for cameras, in industrial robotics and in games consoles is preferred, particularly preferably in the respective corresponding control systems. It is very particularly preferred to use the method and the rotation rate sensor with/as yaw rate and/or yaw acceleration sensor(s) in a motor vehicle control system such as, for example, ESP.

BRIEF DESCRIPTION OF THE DRAWINGS

The invention is best understood from the following detailed description when read in connection with the accompanying drawings. Included in the drawings is the following figures:

FIGS. 1 to 3 show exemplary embodiments for suppressing undesired deflections of the seismic mass perpendicular to the drive direction and perpendicular to the vibration plane, FIGS. 9, 10 show trimming voltages, set by way of example, across a rotation rate sensor having two coupled seismic masses, and FIGS. 11 to 13 show exemplary diagrams illustrating the control of the trimming voltages.

DETAILED DESCRIPTION OF THE PREFERRED EMBODIMENTS

Figure 3:
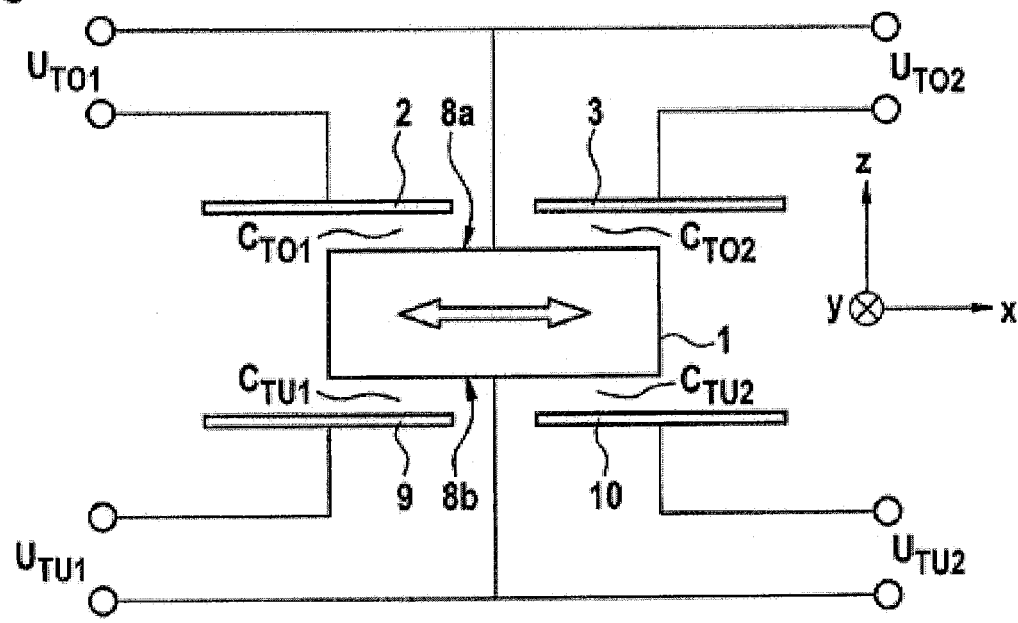

Exemplary embodiments in FIGS. 1 to 10 of at least partially illustrated micromechanical rotation rate sensors are respectively aligned in relation to a Cartesian x-y-z coordinate system of an inertial system whose rotation rate is to be acquired. With reference to this coordinate system, the drive direction for the at least one seismic mass in the x-direction and the respectively exemplary rotation rate sensor, are designed such that the sensor can acquire rotation rates at least around the z-axis and/or y-axis. Moreover, these rotation rate sensors have an application direction or structuring direction in the z-direction with reference to which said sensors are formed from a silicon wafer. In the case of these exemplary embodiments, the trimming electrode elements are respectively arranged immovably, and formed and arranged in a fashion electrically insulated from one another and from the seismic mass. The trimming electrode elements are respectively designed by way of example, in a symmetrical or pairwise symmetrical fashion in relation to the assigned seismic mass, for which reason the first to fourth constant factor can be assumed as 1 in each case.

FIGS. 1 a) and b) illustrate an exemplary rotation rate sensor that has a first and a second trimming electrode element 2, 3 that are jointly assigned to seismic mass 1. Seismic mass 1 is driven in the x-direction and always has parallel to the x-y plane two overlap regions 4 and 5 of a trimming surface 8 of the seismic mass, which are respectively assigned to an electrode surface 6, 7 of a trimming electrode element. This is also the case for maximum deflection $d_{max}$ of seismic mass 1 in the x-direction, as is illustrated in FIG. 1 b).

A first trimming capacitor $C_{TO1}$ and a second trimming capacitor $C_{TO2}$ are formed by trimming surface 8 of seismic mass 1 and the respective electrode surface 6, 7 of the first and second trimming electrode elements 2 and 3, these surfaces 6, 7, 8 being designed parallel to the x-y plane. The first and second trimming voltages $U_{TO1}$ and $U_{TO2}$ are applied to these capacitors, as illustrated in FIG. 2.

FIG. 3 shows an exemplary embodiment of a rotation rate sensor, that has in the z-direction above and below seismic mass 1 trimming electrode elements 2, 3, 9, 10 that are respectively assigned in pair-wise fashion to a trimming surface 8a and 8b of seismic mass 1, parallel to the x-y plane, and respectively form therewith the trimming capacitors $C_{TO1}$, $C_{TO2}$ $C_{TU1}$, $C_{TU2}$, to which the trimming voltages $U_{TO1}$, $U_{TU2}$ are applied as first trimming voltages and $U_{TO2}$, $U_{TU1}$ are applied as second trimming voltages.

The exemplary embodiments illustrated with the aid of FIGS. 1 to 3 are designed to suppress undesired deflections of the seismic mass in the readout direction perpendicular to the drive direction (x-direction) and perpendicular to the x-y plane.

Figure 4:
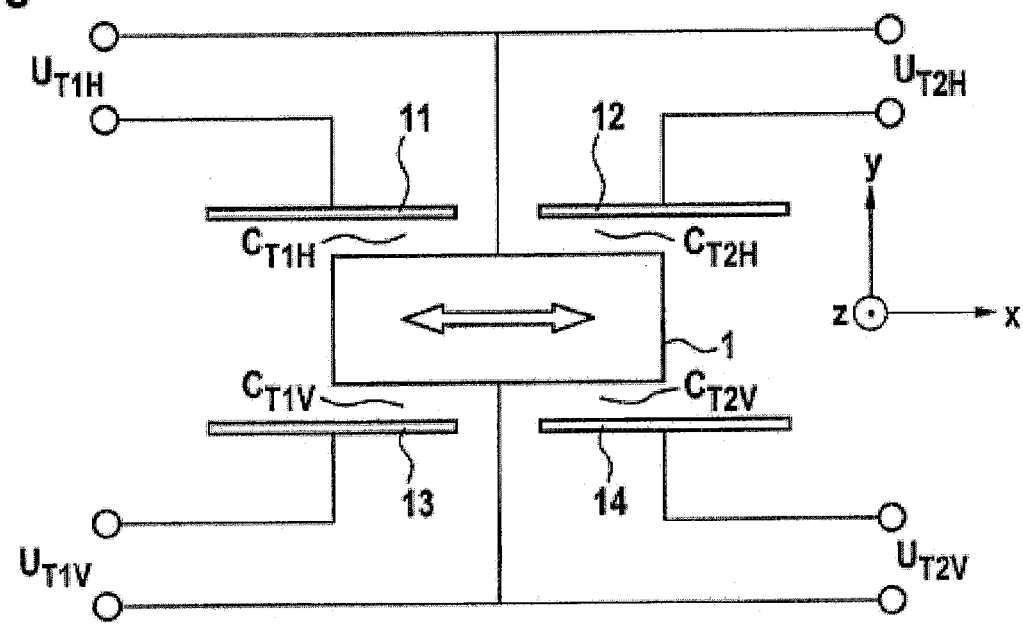
FIGS. 4, 5 show exemplary rotation rate sensors for suppressing undesired deflections of the seismic mass perpendicular to the drive direction and within the vibration plane.

FIG. 4 illustrates an exemplary rotation rate sensor having four trimming electrode elements 11, 12, 13 and 14, that are designed with their electrode surfaces parallel to the x-z plane. Here, trimming electrode elements 11, 12, 13, 14 and seismic mass 1 are designed and arranged such that, even given its maximum deflection in the x-z plane, seismic mass 1 always has a common overlap region with each electrode surface assigned to it. The trimming electrode elements 11, 12, 13, 14 are respectively arranged about a defined length in the y-direction of seismic mass 1 with reference to its undeflected state, and form together with seismic mass 1 four trimming capacitors $C_{T1H}$, $C_{T2H}$, $C_{T1V}$ and $C_{T2V}$, to which electric trimming voltages $U_{T1H}$, $U_{T2V}$ are applied as first trimming voltages and $U_{T2H}$, $U_{T1V}$ are applied as second trimming voltages.

Figure 5:
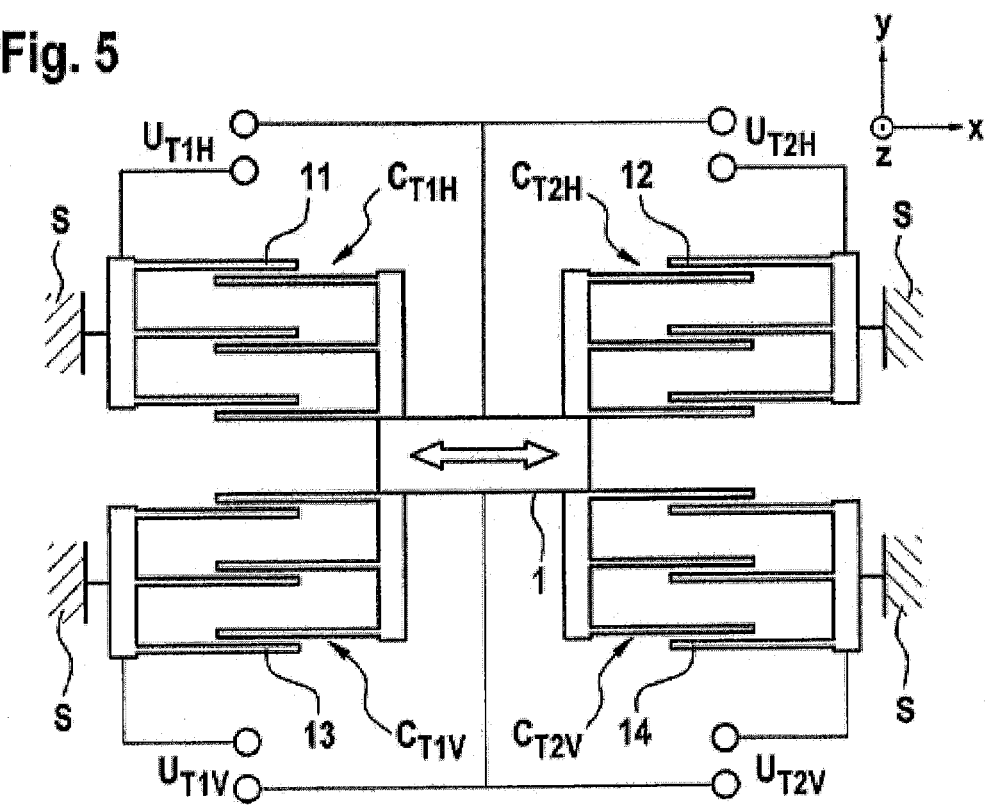

FIG. 5 shows an exemplary embodiment of the rotation rate sensor from FIG. 4, in which trimming electrode elements 11, 12, 13 and 14 are designed as comb structures of which seismic mass 1 has corresponding counterparts, trimming electrode elements 11, 12, 13, 14 respectively being suspended on substrate S. Formed between these comb structures of the trimming electrode elements and the comb structures of the seismic mass 1 are the trimming capacitors $C_{T1H}$, $C_{T2H}$, $C_{T1V}$, $C_{T2V}$, to which the trimming voltages $U_{T1H}$, $U_{T2V}$ are applied as first trimming voltages and $U_{T2H}$, $U_{T1V}$ are applied as second trimming voltages.

The exemplary embodiments illustrated with the aid of FIGS. 4 and 5 are designed to suppress undesired deflections of the seismic mass perpendicular to the drive direction (x-direction) and within the vibration plane (x-y plane), which is defined by the drive mode and the readout mode.

In an exemplary embodiment (not illustrated) of the rotation rate sensor as 2-axis rotation rate sensor, that is to say a rotation rate sensor that is sensitive to rotation rates about two axes, said sensor has eight trimming electrode elements of which four respectively have electrode surfaces parallel to the x-y plane, two above and two below the seismic mass, and four respectively have electrode surfaces parallel to the x-z plane, two arranged upstream and two downstream of the seismic mass. These trimming electrode elements are jointly assigned in this case to a seismic mass.

Figure 6:
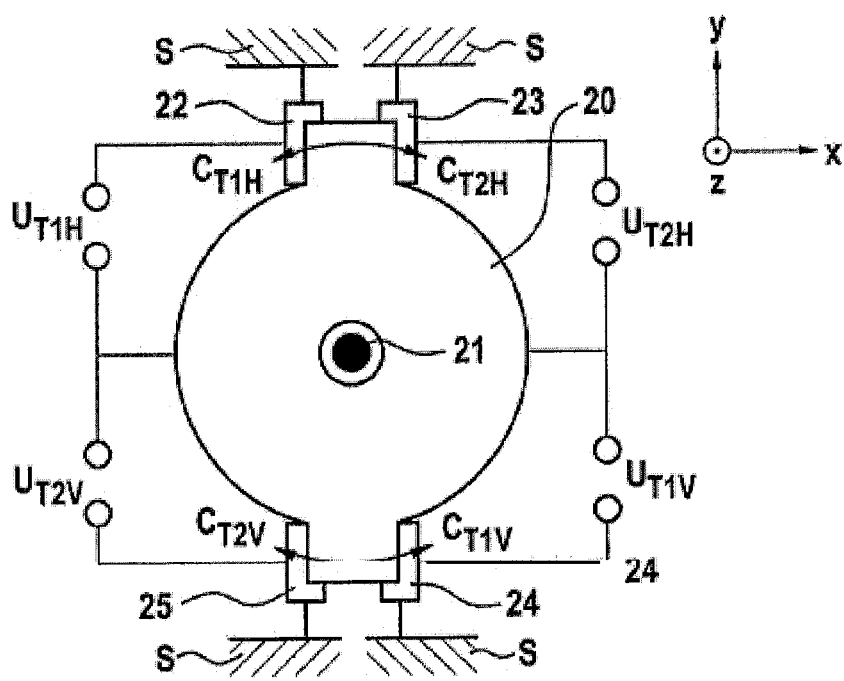
FIG. 6 shows an exemplary rotation rate sensor having a cylindrical seismic mass suspended on a torsion spring.

FIG. 6 illustrates an exemplary embodiment of a rotation rate sensor that has a cylindrical seismic mass 20, that is suspended on a torsion spring 21 that can be deflected in rotary fashion about the z-axis. In addition, torsion spring 21 enables rotary deflections of seismic mass 20 about the x-axis. The drive mode of this exemplary embodiment oscillates in rotary fashion about the z-axis, and the readout mode oscillates in rotary fashion about the x-axis, the opposite edges of seismic mass 20 being deflected in antiphase in the z-direction. Trimming electrode elements 22, 23, 24 and 25 are suspended in this case on substrate S or the inertial system, arranged below seismic mass 20 in the z-direction and assigned thereto and form therewith trimming capacitors $C_{T1H}$, $C_{T2H}$, $C_{T1V}$, $C_{T2V}$ to which the trimming voltages $U_{T1H}$, $U_{T2H}$ are applied as first trimming voltages, and $U_{T2H}$, $U_{T1V}$ are applied as second trimming voltages.

In one exemplary embodiment (not illustrated), four trimming electrode elements are assigned in the z-direction above the seismic mass in a fashion corresponding to the trimming electrode elements from FIG. 6. In a further alternative exemplary embodiment (not illustrated), the seismic mass is assigned eight trimming electrode elements, four below and four above the seismic mass with reference to the z-direction.

Figure 7:
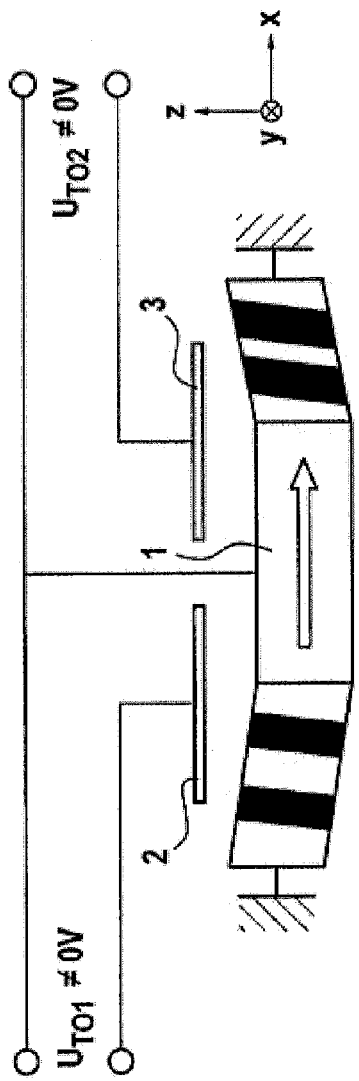
FIGS. 7, 8 show trimming voltages, set by way of example, across a rotation rate sensor having a seismic mass.

The rotation rate sensor illustrated by way of example in FIG. 7 has only a first and a second trimming electrode element 2, 3, which are jointly assigned to seismic mass 1 and therefore form trimming capacitors $C_{TO1}$ and $C_{TO2}$, on which the first electrical trimming voltage $U_{TO1}$ and the second trimming voltage $U_{TO2}$ are present. These two trimming voltages are respectively set in an exemplary method, at least as a function of a quadrature parameter and a resonance parameter. Trimming voltages $U_{TO1}$ and $U_{TO2}$ are applied to trimming capacitors $C_{TO1}$ and $C_{TO2}$ as DC voltages independently of a possible quadrature. To this end, trimming electrode elements 2, 3 are, for example, respectively connected to an electrical voltage source, and seismic mass 1 is connected to the electrical earth. In accordance with the equation $$U_f^2 = U_{TO1}^2 + U_{TO2}^2 \quad (1),$$

trimming voltages $U_{TO1}$ and $U_{TO2}$ are set as a function of the resonance parameter $U_f$. The resonant frequency of the rotation rate sensor is thereby deliberately shifted. If the rotation rate sensor has no quadrature or no quadrature signal, the trimming voltages $U_{TO1}$ and $U_{TO2}$ are set to the same values. Thus holds then that $$U_{TO1} = U_{TO2} \text{ and } U_f^2 = 2U_{TO1}^2 \quad (2).$$

If, however, the rotation rate sensor has a quadrature or a quadrature signal, the latter is additionally eliminated by the trimming voltages. Quadrature parameter $U_T$ is in this case a measure of the electrical voltage required to eliminate the quadrature. Trimming voltages $U_{TO1}$ and $U_{TO2}$ are set, as a function of the quadrature parameter $U_T$, in accordance with the equation $$U_T^2 = U_{TO1}^2 - U_{TO2}^2 \quad (3),$$

the quadrature thereby being eliminated.

In the case when the rotation rate sensor has a maximum trimmable quadrature, the trimming voltages are set at the limit value according to the following relationships:

$$U_T^2 = U_{TO2}^2 \text{ and } U_{TO1}^2 = 0$$

The level of the maximum applicable trimming voltage depends on the maximum available electrode surface and the maximum quadrature signal to be expected. In the case of a quadrature signal that is inverse with regard to the example, the trimming voltages are applied in an interchanged fashion. In accordance with the equations (1) and (3), the trimming voltages are set as follows:

$$U_{TO1}^2 = (U_T^2 + U_f^2)/2 \quad (5)$$

$$\text{and } U_{TO2}^2 = (U_f^2 - U_T^2)/2 \quad (6).$$

Figure 8:
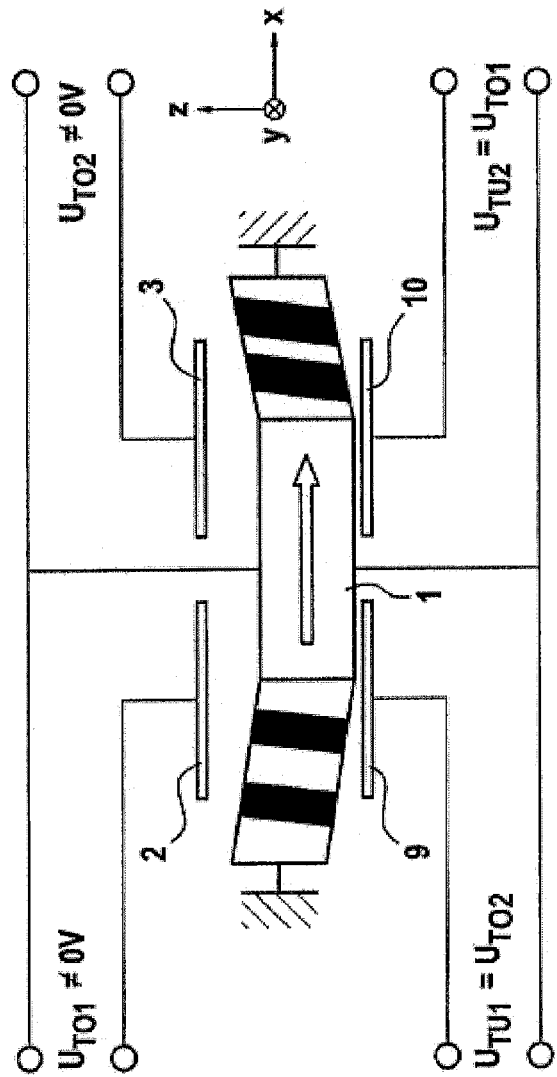

The exemplary embodiment illustrated in FIG. 8 is based on the exemplary embodiment shown in FIG. 7, but has been supplemented in this case by two additional trimming electrode elements 9 and 10 that are arranged below seismic mass 1 in the z-direction.

These form additional trimming capacitors $C_{TU1}$ and $C_{TU2}$ with seismic mass 1. In this case, trimming voltage $U_{TU1} = U_{TO2}$ is applied to trimming capacitor $C_{TU1}$, that is to say the same trimming voltage is applied as to trimming capacitor $C_{TO2}$, and trimming voltage $U_{TU2} = U_{TO1}$ is applied to trimming capacitor $C_{TU2}$, that is to say the same trimming voltage as is applied to trimming capacitor $C_{TO1}$. Trimming voltages $U_{TO1}$, $U_{TO2}$, $U_{TU1}$, and $U_{TU2}$ are selected, for example, as defined by equations (5) and (6), and therefore set as a function of the quadrature parameter $U_T$ and of resonance parameter $U_f$ in order to eliminate the quadrature of the rotation rate sensor in conjunction with setting a defined resonant frequency of the readout mode of the rotation rate sensor.

Illustrated respectively in FIGS. 9 and 10 is an exemplary embodiment of a rotation rate sensor that has two seismic masses 1 and 15 that are coupled to one another via a coupling element 16, for example designed as a spring. Seismic masses 1 and 15 are driven in this case in antiphase and therefore has an antiphase drive mode and, as a result of this, the common centroid remains at rest and the two seismic masses 1, 15 have a common resonant frequency with respective regard to the drive mode and the readout mode. The suspension spring elements 17 of the seismic masses 1, 15 are tilted, for example, in the same direction. The trimming voltages across the respective trimming capacitors $C_{TLO1}$, $C_{TLO2}$, $C_{TRO1}$ and $C_{TRO2}$ between trimming electrode elements 2, 3 and seismic mass 1 as well as between trimming electrode elements 18, 19 and seismic mass 15 are respectively set identically in pairwise fashion, that is to say the first trimming voltages are set to $C_{TLO1}$ and $C_{TRO1}$, $U_{TLO1}$, $U_{TRO1}$, and the second trimming voltages are set to $C_{TLO2}$ and $C_{TRO2}$, $U_{TLO2}$, $U_{TRO2}$ identically in pairwise fashion. The exemplary embodiment illustrated with the aid of FIG. 10 additionally respectively has two trimming electrode elements 31, 32, 33 and 34 in the z-direction below the seismic masses 1 and 15. In this case, the first and the second trimming voltages are set as follows:
first trimming voltage: $U_{TLO1} = U_{TRO1} = U_{TLU2} = U_{TRU2}$, and
second trimming voltage: $U_{TLO2} = U_{TRO2} = U_{TLU1} = U_{TRU1}$.

Figure 11:
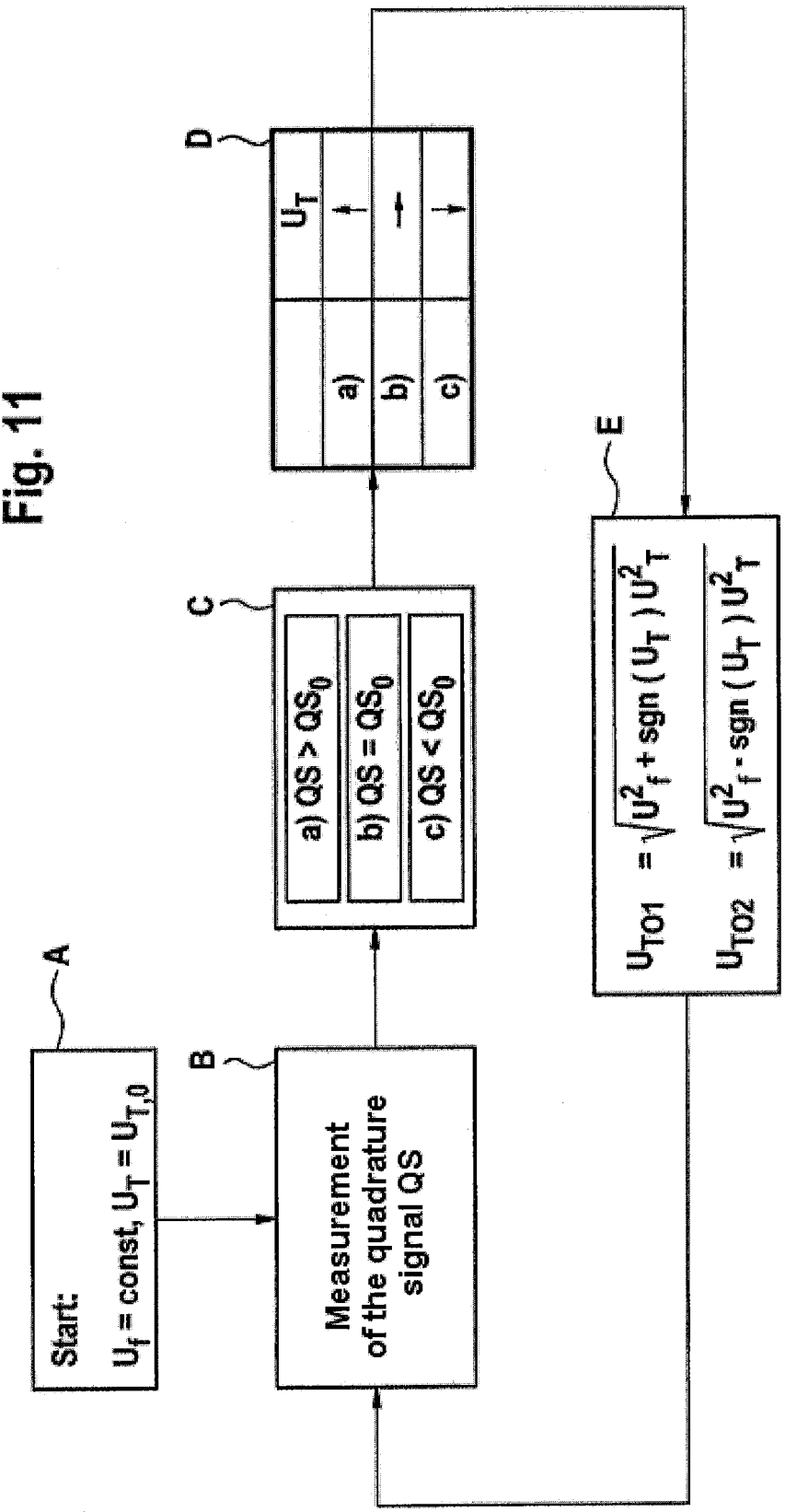
Figure 12:
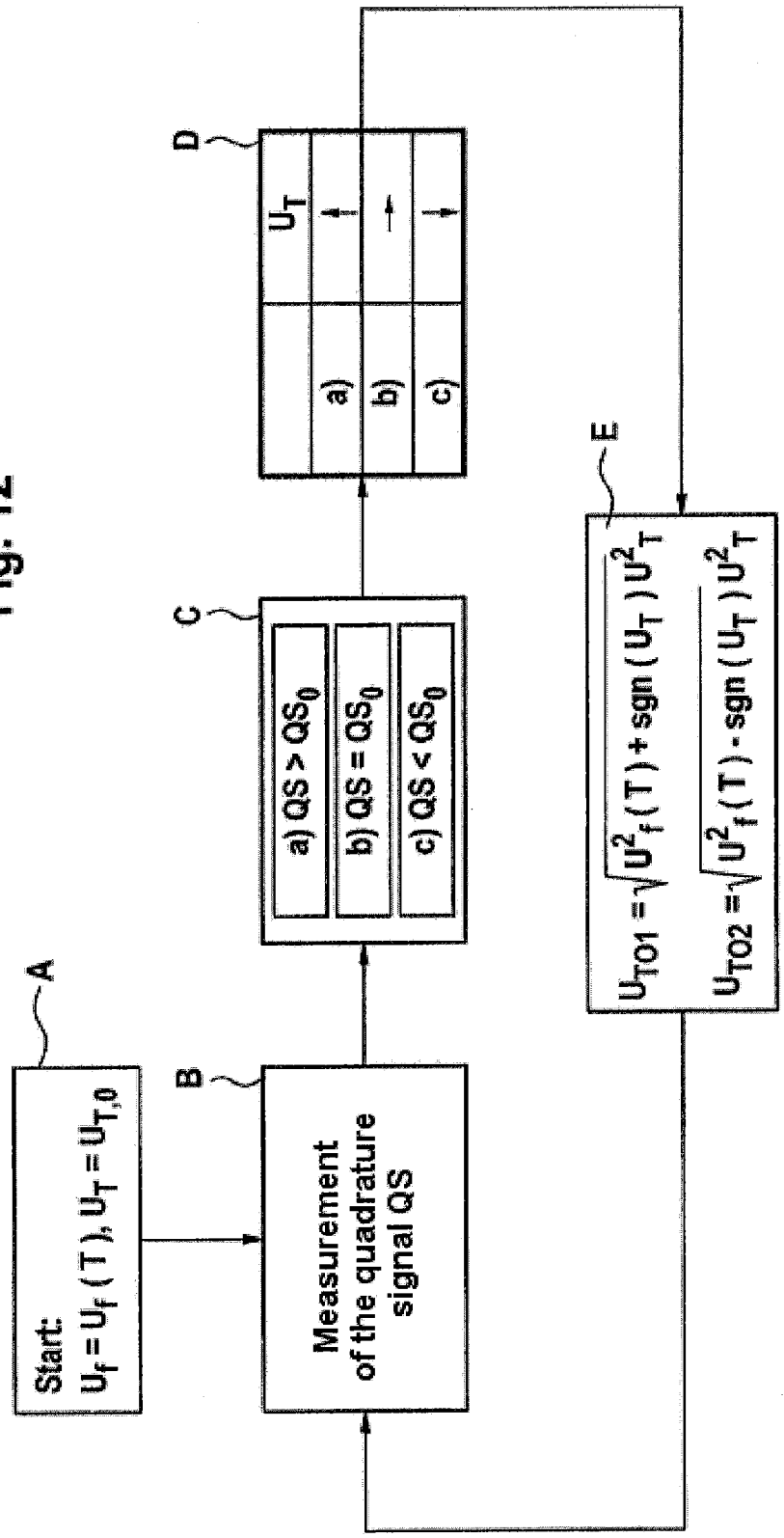

FIGS. 11 and 12 illustrate two exemplary diagrams that illustrate the control of the first and second trimming voltage with the aid of the quadrature parameter $U_T$ and of the resonance parameter $U_f$. The quadrature parameter $U_T$ and the resonance parameter $U_f$ are defined at the beginning "Start", function block A. The control systems illustrated in FIG. 11 and FIG. 12 are used to carry out only a quadrature trimming/control, and the resonant frequency/frequency of the readout mode remains substantially uninfluenced by means of the method. In FIG. 11, the resonance parameter $U_f$ has a defined constant value, and in FIG. 12 $U_f$ changes as a function of the temperature. The quadrature parameter $U_T$, which is dependent on the quadrature signal of the rotation rate sensor, has a constant start value that can, for example, even be 0. Subsequently, the quadrature signal QS is measured in function block B: it is detected and correspondingly acquired as component of the readout signal phase-shifted by 180° or 0° in relation to the drive mode, or is phase-shifted as signal component mapped at 90° or 270° in relation to the rotation rate, or useful signal of the readout signal. Thereafter, it is assessed in function block C whether the measured quadrature signal QS is greater than or less than or equal to a threshold value, for example 0. Dependent thereon, the quadrature parameter $U_T$ is subsequently increased or reduced or kept the same in function block D, which can be carried out, for example, by addition and/or multiplication with the aid of a function and/or a defined value. This means that, in function block E, the trimming voltages $U_{TO1}$ and $U_{TO2}$ are respectively applied to the trimming capacitors of the rotation rate sensor as a function of the quadrature parameter $U_T$ and of the resonance parameter $U_f$ in accordance with the formulas illustrated, sgn being defined as the signum function. These drive functions in this case form the manipulated variables of the control system. Function block B is subsequently executed again, and the following control loop begins.

In the schematic, exemplary method diagram from FIG. 13, both parameters $U_f$ and $U_T$ start with a defined value in function block A. Subsequently, the quadrature signal QS is measured in function block B, as is the frequency difference $\Delta f$ between the readout mode and the drive mode. Thereafter, these values QS, $\Delta f$ are respectively compared in function block C with defined threshold values, after which quadrature parameter $U_T$ and resonance parameter $U_f$ are fitted in function block D in accordance with the respective comparative results a), b), c), d), e), f), as illustrated in function block D. This fitting comprises increasing or reducing the parameters $U_T$ and $U_f$, or not influencing them, one or more addition/subtraction and/or multiplications, for example, being carried out with the aid of one or more defined constants and/or functions. Thereafter, in function block E, the trimming voltages $U_{TO1}$ and $U_{TO2}$ are respectively applied to the trimming capacitors of the rotation rate sensor as a function of the quadrature parameter $U_T$ and resonance parameter $U_f$ in accordance with the formulas illustrated, sgn being defined as the signum function. It is possible hereby, as a function of the fitting of the parameters $U_T$ and $U_f$, both to carry out a quadrature suppression and, at the same time, to carry out a frequency fit or frequency shift of the readout mode by means of the same trimming electrode elements and trimming voltages. Function block B is subsequently executed again, and the following control loop begins.

It is assumed or presupposed in the exemplary embodiments illustrated in FIGS. 11 to 13 that squaring the quadrature parameter $U_T$ leads to a reduction in the quadrature signal QS, and that the exemplary rotation rate sensor is correspondingly designed.

The invention claimed is:

1. A method for a precise measuring operation of a micromechanical rotation rate sensor, comprising at least one deflectively suspended seismic mass, at least one drive device for driving the seismic mass and at least one first and one second trimming electrode element, which are jointly assigned directly or indirectly to the seismic mass, the method comprising:
   setting a first electrical trimming voltage ($U_{TO1}$, $U_{TLO1}$, $U_{TRO1}$, $U_{TU2}$, $U_{T1H}$, $U_{T2V}$) between the first trimming electrode element and the seismic mass; and
   setting a second electrical trimming voltage ($U_{TO2}$, $U_{TLO2}$, $U_{TRO2}$, $U_{TU1}$, $U_{T2H}$, $U_{T1V}$) between the second trimming electrode element and the seismic mass,
   wherein the first and the second electrical trimming voltages are set at least as a function based on a square root of a summation of a squared quadrature parameter ($U_T$) determined from a measured quadrature signal of the rotation rate sensor and a squared resonance parameter ($U_f$), and
   wherein the quadrature parameter is:
   a) increased when the measured quadrature signal is above a quadrature threshold,
   b) decreased when the measured quadrature signal is below the quadrature threshold, and
   c) maintained the same when the measured quadrature signal is equal to the quadrature threshold.

2. The method as claimed in claim 1, wherein the setting of the first and second trimming voltages is performed by means of a control system.

3. The method as claimed in claim 1, wherein the first ($U_{TO1}$, $U_{TLO1}$, $U_{TRO1}$, $U_{TU2}$, $U_{T1H}$, $U_{T2V}$) and the second ($U_{TO2}$, $U_{TLO2}$, $U_{TRO2}$, $U_{TU1}$, $U_{T2H}$, $U_{T1V}$) electrical trimming voltages are set so that the sum of the square of the first electrical trimming voltage ($U_{TO1}$, $U_{TLO1}$, $U_{TRO1}$, $U_{TU2}$, $U_{T1H}$, $U_{T2V}$) multiplied by a first constant factor ($\alpha$) and of the square of the second electrical trimming voltage ($U_{TO2}$, $U_{TLO2}$, $U_{TRO2}$, $U_{TU1}$, $U_{T2H}$, $U_{T1V}$) multiplied by a second constant factor ($\beta$), is held constant and/or is set to a first reference value of the resonance parameter ($U_f$) in relation to the square.

4. The method as claimed in claim 3, wherein, in addition the difference of the square of the first electrical trimming voltage ($U_{TO1}$, $U_{TLO1}$, $U_{TRO1}$, $U_{TU2}$, $U_{T1H}$, $U_{T2V}$) multiplied by a third constant factor ($\gamma$) and of the square of the second electrical trimming voltage ($U_{TO2}$, $U_{TLO2}$, $U_{TRO2}$, $U_{TU1}$, $U_{T2H}$, $U_{T1V}$) multiplied by a fourth constant factor ($\delta$), is held constant and/or is set to a first reference value of the quadrature parameter ($U_T$) in relation to the square.

5. The method as claimed in claim 4, wherein the first ($\alpha$), the second ($\beta$), the third ($\gamma$) and the fourth ($\delta$) constant factors have a positive value that is respectively at least a function of a first ($C_{TO1}$, $C_{TLO1}$, $C_{TRO1}$) and a second trimming capacitor ($C_{TO2}$, $C_{TLO2}$, $C_{TRO2}$), the first trimming capacitor ($C_{TO1}$, $C_{TLO1}$, $C_{TRO1}$) being at least a function of the respective design of the first trimming electrode element and of the seismic mass as well as their arrangement and relative motion behavior relative to one another, and the second trimming capacitor ($C_{TO2}$, $C_{TLO2}$, $C_{TRO2}$) being at least a function of the respective design of the second trimming electrode element and of the seismic mass as well as their arrangement and relative motion behavior relative to one another.

6. The method as claimed in claim 1, wherein the first ($U_{TO1}$, $U_{TLO1}$, $U_{TRO1}$, $U_{TU2}$, $U_{T1H}$, $U_{T2V}$) and the second ($U_{TO2}$, $U_{TLO2}$, $U_{TRO2}$, $U_{TU1}$, $U_{T2H}$, $U_{T1V}$) electrical trimming voltages are set so that the sum of the first electrical trimming voltage ($U_{TO1}$, $U_{TLO1}$, $U_{TRO1}$, $U_{TU2}$, $U_{T1H}$, $U_{T2V}$) multiplied by a first constant factor ($\alpha$) and of the second electrical trimming voltage ($U_{TO2}$, $U_{TLO2}$, $U_{TRO2}$, $U_{TU1}$, $U_{T2H}$, $U_{T1V}$) multiplied by a second constant factor ($\beta$), is held constant and/or is set to a first reference value of the resonance parameter ($U_f$), and in that, particularly in addition, the difference of the first electrical trimming voltage ($U_{TO1}$, $U_{TLO1}$, $U_{TRO1}$, $U_{TU2}$, $U_{T1H}$, $U_{T2V}$) multiplied by a third constant factor ($\gamma$) and the second electrical trimming voltage ($U_{TO2}$, $U_{TLO2}$, $U_{TRO2}$, $U_{TU1}$, $U_{T2H}$, $U_{T1V}$) multiplied by a fourth constant factor ($\delta$), is held constant and/or is set to a first reference value of the quadrature parameter ($U_T$).

7. The method as claimed in claim 3, wherein said method comprises a control method by which the resonance parameter ($U_f$) or the first reference value of the resonance parameter is prescribed as a time function of at least one additional parameter of the rotation rate sensor and/or of an additional parameter that influences the operation of the rotation rate sensor, or is replaced by at least one second reference value of the resonance parameter.

8. The method as claimed in claim 7, wherein the additional parameter is a temperature prevailing in the rotation rate sensor and/or in its immediate surroundings.

9. The method as claimed in claim 1, wherein at least the first trimming electrode element is connected to a first electrical voltage source and the second trimming electrode element and/or the seismic mass are/is connected, in particular, to a second electrical voltage source.

10. The method as claimed in claim 1, wherein the first and the second trimming electrode elements respectively have at least one electrode surface that are arranged situated opposite a trimming surface of the seismic mass in a substantially parallel fashion, and the electrode surfaces of the first and second trimming electrode elements always being assigned an opposite region of the trimming surface of the seismic mass, and/or respectively overlapping the same, in particular independently of the state of deflection of the seismic mass, at least up to a defined amplitude/deflection.

11. A micromechanical rotation rate sensor, comprising:
at least one deflectively suspended seismic mass;
at least one drive device for driving the seismic mass; and
at least one first and one second trimming electrode element, which are jointly assigned directly or indirectly to the seismic mass, in particular at least the first trimming electrode element being connected to a first electrical voltage source, a first electrical trimming voltage ($U^{TO1}$, $U_{TLO1}$, $U_{TRO1}$, $U_{TU2}$, $U_{T1H}$, $U_{T2V}$) being set between the first trimming electrode element and the seismic mass, and a second electrical trimming voltage ($U^{TO2}$, $U_{TLO2}$, $U_{TRO2}$, $U_{TU1}$, $U_{T2H}$, $U_{T1V}$) being set between the second trimming electrode element and the seismic mass,
wherein the first and the second electrical trimming voltages are set at least as a function based on a square root of a summation of a squared quadrature parameter ($U_T$) determined from a measured quadrature signal of the rotation rate sensor and a squared resonance parameter ($U_f$), and
wherein the quadrature parameter is:
a) increased when the measured quadrature signal is above a quadrature threshold,
b) decreased when the measured quadrature signal is below the quadrature threshold, and
c) maintained the same when the measured quadrature signal is equal to the quadrature threshold.

12. The use of the rotation rate sensor as claimed in claim 11 in a motor vehicle.

13. The use of the rotation rate sensor as claimed in claim 11 in a motor vehicle control system.

\* \* \* \* \*